(12) United States Patent
Kim et al.

(10) Patent No.: US 9,615,091 B2
(45) Date of Patent: Apr. 4, 2017

(54) MOTION PICTURE ENCODING/DECODING APPARATUS, AND METHOD AND APPARATUS FOR HYBRID BLOCK MOTION COMPENSATION/OVERLAPPED BLOCK MOTION COMPENSATION FOR SAME

(75) Inventors: Hayoon Kim, Seongnam-si (KR); Yungho Choi, Anyang-si (KR); Yoonsik Choe, Goyang-si (KR); Yonggoo Kim, Seoul (KR); Byongho Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 1391 days.

(21) Appl. No.: 13/124,225

(22) PCT Filed: Oct. 8, 2009

(86) PCT No.: PCT/KR2009/005744
§ 371 (c)(1),
(2), (4) Date: Apr. 14, 2011

(87) PCT Pub. No.: WO2010/044566
PCT Pub. Date: Apr. 22, 2010

(65) Prior Publication Data
US 2011/0235704 A1    Sep. 29, 2011

(30) Foreign Application Priority Data
Oct. 15, 2008  (KR) .................. 10-2008-0101131

(51) Int. Cl.
H04N 7/26      (2006.01)
H04N 19/103   (2014.01)
(Continued)

(52) U.S. Cl.
CPC ......... *H04N 19/103* (2014.11); *H04N 19/129* (2014.11); *H04N 19/146* (2014.11); *H04N 19/176* (2014.11); *H04N 19/583* (2014.11)

(58) Field of Classification Search
CPC .................................................. H04N 19/103
(Continued)

(56) References Cited

U.S. PATENT DOCUMENTS

2005/0207664 A1*  9/2005  Ramasastry et al. ......... 382/240
2006/0193388 A1*  8/2006  Woods et al. ............ 375/240.16

FOREIGN PATENT DOCUMENTS

KR   10-0266161   9/2000
KR   10-0446083   8/2004
KR   10-0565066   3/2006

OTHER PUBLICATIONS

International Search Report mailed Apr. 30, 2010 for PCT/KR2009/005744.

* cited by examiner

*Primary Examiner* — Christopher S Kelley
*Assistant Examiner* — Jonathan Messmore
(74) *Attorney, Agent, or Firm* — Hauptman Ham, LLP (57) ABSTRACT

A hybrid block motion compensation/adaptive overlapped block motion compensation apparatus for an encoding apparatus includes: a selector for selecting between a block motion compensation BMC and an overlapped block motion compensation OBMC with respect to a current block in units of pixels according to a set criterion; an adaptive motion compensator; a scan mode setter for scanning the current block in a plurality of set scan modes and establishing a scan mode causing a smallest number of transitions between the BMC and OBMC; and an information recorder for recording transition information at locations of the pixels corresponding to the transitions between the BMC and OBMC. A
(Continued)

decoding apparatus is disclosed including: an interpreter for scan mode information of a current block and information about transitions between the BMC and OBMC for each of pixels of the current block; and an adaptive motion compensator for operating in units of the pixels.

17 Claims, 8 Drawing Sheets

(51) Int. Cl.
  *H04N 19/176* (2014.01)
  *H04N 19/129* (2014.01)
  *H04N 19/146* (2014.01)
  *H04N 19/583* (2014.01)

(58) Field of Classification Search
  USPC ...... 375/240–240.02, 240.08, 240.1–240.16, 375/240.24
  See application file for complete search history.

|   |   |   |   |   |   |   |   |
|---|---|---|---|---|---|---|---|
| 2 | 2 | 2 | 2 | 2 | 2 | 2 | 2 |
| 1 | 1 | 2 | 2 | 2 | 2 | 1 | 1 |
| 1 | 1 | 1 | 1 | 1 | 1 | 1 | 1 |
| 1 | 1 | 1 | 1 | 1 | 1 | 1 | 1 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

(a) $H_C(x,y)$

|   |   |   |   |   |   |   |   |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 1 | 1 | 1 | 1 | 1 | 1 | 1 | 1 |
| 1 | 1 | 1 | 1 | 1 | 1 | 1 | 1 |
| 1 | 1 | 2 | 2 | 2 | 2 | 1 | 1 |
| 2 | 2 | 2 | 2 | 2 | 2 | 2 | 2 |

(b) $H_T(x,y)$

|   |   |   |   |   |   |   |   |
|---|---|---|---|---|---|---|---|
| 4 | 5 | 5 | 5 | 5 | 5 | 5 | 4 |
| 5 | 5 | 5 | 5 | 5 | 5 | 5 | 5 |
| 5 | 5 | 6 | 6 | 6 | 6 | 5 | 5 |
| 5 | 5 | 6 | 6 | 6 | 6 | 5 | 5 |
| 5 | 5 | 6 | 6 | 6 | 6 | 5 | 5 |
| 5 | 5 | 6 | 6 | 6 | 6 | 5 | 5 |
| 5 | 5 | 5 | 5 | 5 | 5 | 5 | 5 |
| 4 | 5 | 5 | 5 | 5 | 5 | 5 | 4 |

(c) $H_B(x,y)$

|   |   |   |   |   |   |   |   |
|---|---|---|---|---|---|---|---|
| 2 | 1 | 1 | 1 | 0 | 0 | 0 | 0 |
| 2 | 2 | 1 | 1 | 0 | 0 | 0 | 0 |
| 2 | 2 | 1 | 1 | 0 | 0 | 0 | 0 |
| 2 | 2 | 1 | 1 | 0 | 0 | 0 | 0 |
| 2 | 2 | 1 | 1 | 0 | 0 | 0 | 0 |
| 2 | 2 | 1 | 1 | 0 | 0 | 0 | 0 |
| 2 | 2 | 1 | 1 | 0 | 0 | 0 | 0 |
| 2 | 1 | 1 | 1 | 0 | 0 | 0 | 0 |

(d) $H_L(x,y)$

|   |   |   |   |   |   |   |   |
|---|---|---|---|---|---|---|---|
| 0 | 0 | 0 | 0 | 1 | 1 | 1 | 2 |
| 0 | 0 | 0 | 0 | 1 | 1 | 2 | 2 |
| 0 | 0 | 0 | 0 | 1 | 1 | 2 | 2 |
| 0 | 0 | 0 | 0 | 1 | 1 | 2 | 2 |
| 0 | 0 | 0 | 0 | 1 | 1 | 2 | 2 |
| 0 | 0 | 0 | 0 | 1 | 1 | 2 | 2 |
| 0 | 0 | 0 | 0 | 1 | 1 | 2 | 2 |
| 0 | 0 | 0 | 0 | 1 | 1 | 1 | 2 |

(a) SCAN MODE 1

(b) SCAN MODE 2

(c) SCAN MODE 3

(d) SCAN MODE 4

(e) SCAN MODE 5

(f) SCAN MODE 6

(g) SCAN MODE 7

(h) SCAN MODE 8

*FIG. 9*

MOTION PICTURE ENCODING/DECODING APPARATUS, AND METHOD AND APPARATUS FOR HYBRID BLOCK MOTION COMPENSATION/OVERLAPPED BLOCK MOTION COMPENSATION FOR SAME

CROSS REFERENCE TO RELATED APPLICATION

This application claims the priority of Korean Patent Application No. 10-2008-0101131, filed on Oct. 15, 2008, in the KIPO (Korean Intellectual Property Office), the disclosure of which is incorporated herein in their entirety by reference. Further, this application is the National Phase application of International Application No. PCT/KR2009/005744, filed Oct. 8, 2009, which designates the United States and was published in Korean. Each of these applications is hereby incorporated by reference in their entirety into the present application.

TECHNICAL FIELD

The present disclosure relates to a video data compression/decompression technique. More particularly, the present disclosure relates to a video encoding/decoding apparatus, and method and apparatus for hybrid block motion compensation/overlapped block motion compensation adapted to apply an overlapped block motion compensation (OBMC) by units of a pixel wherein the disclosure removes complex computations needed for determining the method of motion compensation with respect to each of the pixels to control the computation complexity, performs an optimum motion compensation by units of a pixel so as to generate least residual pixel energy to increase the compression performance in an encoding, and resolves a blurring artifact or an over-smoothing problem inherent in OBMC.

BACKGROUND ART

The statements in this section merely provide background information related to the present disclosure and may not constitute prior art.

Generally, the most currently existing commercial video compression methods and their apparatuses effectively remove temporal redundancies which are present in natural videos by using a block motion estimation/compensation method and an apparatus thereof. Such a block motion estimation/compensation method is based on an assumption that all the pixels in a block basically have the same motion, and performs a prediction/reconstruction on the respective block pixels of the subject current image to be encoded by using previously compressed and transmitted image(s). Propelled by the simple but efficient basic assumption, the block motion compensation has a little motion parameters to encode and transmit, and thereby makes a significant contribution to improving the compression efficiency of video data. However, this method involves blocking artifacts caused by a lack of conformity that some pixels (normally at block boundaries) in the blocks do not conform to a basic model, wherein the blocking artifact means unsightly latticed artificial coding errors observed at the respective block boundaries. In order to solve the blocking artifacts, many conventional techniques have become available, and the overlapped block motion compensation is one of them.

The technique of overlapped block motion compensation is performed in motion reconstructions for the respective blocks by a weighted addition of the reconstructed current location pixels based on motions of adjacent blocks to reconstructed pixels in a current block as a way of reflecting the motions of the adjacent blocks in the motion reconstruction of the current block, whereby errors in the motion reconstruction at the block boundaries are effectively and significantly reduced. However, in the case where the motions of the adjacent block are significantly deviated from the current block, the motion reconstruction by the overlapped block motion compensation is known to show a greater deterioration than the typical block motion reconstruction or cause blurring artifacts which blur edge information of the blocks. This phenomenon is often called over-smoothing problem, which occurs when the relatively correctly predicted pixel values at the block boundaries under the well satisfied assumption with the block motion estimation method undergo a weighted addition to pixels in the adjacent blocks having a critical error caused by the overlapped block motion reconstruction. Generally, the reason for showing a significant difference between motions of two adjacent blocks is because the most of the pixels in the respective blocks have disparities in actual motions which are caused by the different imaged objects of possibly different dynamic natures within the video. Therefore, such over-smoothing problem generally occurs to the in-video objects at their edges which happen to be extra important video information, and thus resolving the over-smoothing problem is important in further improving the video compression performance and obtaining an even higher quality reconstructed video.

To solve such over-smoothing problem, there exist prior arts in the form of various techniques that mostly address the motion reconstruction of the respective blocks by adaptively applying, via selecting between, the overlapped block motion compensation and the typical block motion compensation. According to Ji Zhongwei, Jiang Wenjun, and Zhu Weile ("Wavelet-based video coding using adaptive overlapped block motion compensation", in Proc. ICCCS'02, 29 Jun.-1 Jul. 2002, vol. 2, pp. 1090-1093), encoding is performed as the respective blocks are tried with the overlapped block motion compensation and the conventional block motion compensation, and then mean-squared errors for the respective methods are compared to select one that has a lower value. Though this technique could have attained an improved motion reconstruction performance by way of time-processing always in a method with less errors in motion compensation, a decoder is unable to reproduce the mean-squared errors for the respective methods which the encoder used in its selection, necessitating transmission of a form of additional information as to the method for motion-reproducing the respective blocks and the consequent bit rate of the information may pointedly deteriorate the overall compression performance.

There are various types of prior arts to perform an adaptive overlapped block motion compensation while handling the problematic increase of bit rate with the extra information transmission, and firstly Tien-ying Kuo and C.-C. Jay Kuo ("A hybrid BMC/OBMC motion compensation scheme", in Proc. ICIP'97, 26-29 Oct. 1997, vol. 2, pp. 795-798) suggested to obtain a displaced frame difference from two previously decoded images based on which the motion compensation methods were switched. In particular, a decoder with no extra information was made to adaptively select between the block motion compensation and the overlapped block motion compensation by allowing the overlapped block motion compensation to be performed only when a differential image block at the same location of the current block for being motion compensated has a number of pixels above a particular threshold. Likewise, other various conventional techniques have their proprietary criteria to obviate extra information needed to select the motion compensation methods for each block, and Young Su Lee suggested in "Moving picture compensation apparatus in MPEG4 decoding", Korean Patent Registration No. 1002804980000, Nov. 10, 2000 to use a high band frequency energy value of transmitted and decoded DCT (discrete cosine transform) coefficients; Sung-hee Lee and Bong-soo Hur ("Apparatus to provide block-based motion compensation and method thereof", US Patent, PN US2004/0252896, Dec. 16, 2004), Seung Hwan Kim, Dong-il Chang, Choong Woong Lee, and Sang Uk Lee ("Complexity reduction method for overlapped block motion compensation based on spatio-temporal correlation", in Proc. ISCAS'99, 30 May-2 June 1999, vol. 4, pp. 211-214), and others suggested using motion vector differences between a current block under decoding and its neighboring blocks as the criteria; and Jun Zhang ("Adaptive overlapped block matching for accurate motion compensation", US Patent, PN US2006/0083310, Apr. 20, 2006) selectively applies an overlapped block motion compensation based on the statistical standard deviation between inside and outside regions of a block for the motion compensation.

Though the above prior arts for adaptively selecting motion compensation methods without requiring extra information have contributed to relieving from the over-smoothing problem by providing their respective selection criteria, they commonly have one important deficiency. That is, the respective approaches select a motion reconstruction method in units of respective blocks methods and let the selected method applied to performing motion reconstructions on all of the pixels within a block, which disables a motion reconstruction in a finer unit such as on the basis of boundaries of the respective blocks or by each pixel in a block resulting in incomplete solutions to the over-smoothing problem.

This deficiency may be somewhat resolved by a method suggested by Jiro Katto ("Overlapped motion compensation using a window function which varies in response to an input picture", U.S. Pat. No. 5,602,593, Feb. 11, 1997) wherein a weight for use in the weighted addition is adjusted by an input image and the statistical characteristics of a motion compensation error. In other words, the value of the weight for use in the overlapped block motion compensation is made variable by the statistical characteristics of a particular video inputted or a particular image of the inputted video, or even a particular boundary of the inputted image with the weight valued '0' directing the typical block motion compensation method, which entitles the suggested method to be an expansion of the conventional block based adaptive motion compensation method for selecting motion reconstruction methods to an even more refined level at the block boundary units. However, since the statistical characteristics referred to in this method as being the basis for adjusting the weight mean the inputted images, or a statistical standard deviation and correlation belonged to a group of pixels corresponding to a part of an image, and a statistic expectation of the motion reconstruction errors, there is a significant computation volume required for their estimations, and its application to such a small region as a block boundary increases the uncertainty of the estimation accuracy resulting in a limitation of the performance. Besides, such statistical parameters used in the weight adjustment are not what can be reproduced by calculations in a decoder and they must be disadvantageously transmitted in the form of extra information to the decoder.

Problems with the suggested method by Jiro Katto ("Overlapped motion compensation using a window function which varies in response to an input picture", U.S. Pat. No. 5,602,593, Feb. 11, 1997) are expected to be resolved by a modification of the suggestion of Byeong-Doo Choi, Jong-Woo Han, Chang-Su Kim, and Sung-Jae Ko ("Motion-compensated frame interpolation using bilateral motion estimation and adaptive overlapped block motion compensation", IEEE Trans. Circuits and Syst. for Video Technol., vol. 17, pp. 407-416, April 2007) which is based on a reliability for indicating the similarity of reconstructions of pixels of the subject block using motions of boundary blocks to the actual pixels of the block for current reconstruction and uses a greater weight in proportion to the reliability. However, because this method is designed for application of frame interpolation, the reliability information in the video compression application cannot be reproduced in a decoder as the weight adjustment criterion, and the method is unable to expand towards the overlapped block motion compensation by the pixel units short of becoming a more refined type of the adaptive technique.

An example of a conventional method for adjusting the overlapped block motion compensation by the pixel units was suggested by Chih-lung Bruce Lin, Ming-Chieh Lee, and Wei-ge Chen ("Overlapped motion compensation for object coding", U.S. Pat. No. 5,982,438, Nov. 9, 1999) wherein the respective pixels in a single block are subjected to the overlapped block motion compensation only when they belong to the same object as that of the adjacent blocks whereby the over-smoothing problem is resolved. However, this method needs a provision of an object map and a transmission as additional information of the object map, which is hardly generated by the current techniques automatically from natural images which renders it really impractical for compressed encoding of video information.

DISCLOSURE

Technical Problem

Therefore, the present disclosure has been made for providing a video encoding/decoding apparatus, and method and apparatus for hybrid block motion compensation/overlapped block motion compensation which allow for performing optimum motion compensation for each pixel with the least computation volume or complexity that has been possible. In particular, the present disclosure is to provide a video encoding/decoding apparatus, and method and apparatus for hybrid block motion compensation/overlapped block motion compensation adapted to apply an overlapped block motion compensation (OBMC) by units of a pixel wherein the disclosure removes complex computations needed for determining the method of motion compensation with respect to each of the pixels to control the computation complexity, performs an optimum motion compensation by units of a pixel so as to generate least residual pixel energy to increase the compression performance in an encoding, and resolves a blurring artifact or an over-smoothing problem inherent in OBMC.

Technical Solution

In order to achieve the above objectives, the present disclosure performs an adaptive pixel overlapped block motion compensation with a reduced calculation volume and an optimized selection of motion compensation for each pixel by using dedicated BMC/OBMC determination criteria in an encoder for determining the best motion compensation method by pixel units of an image block, and has the encoder assign a very small bit for generating information that can identify the BMC/OBMC determination with respect to each pixel of the block, and allows the decoder to determine the motion compensation method for each pixel by referring to a very small bit transmitted from the encoder without the need to reproduce the formula used in the encoder for the best BMC/OBMC determination, thereby the decoder can perform the best motion compensation by pixel units with a small calculation volume.

One aspect of the present disclosure provides a hybrid block motion compensation/adaptive overlapped block motion compensation apparatus including: a BMC/OBMC selector for performing a BMC/OBMC selection between a block motion compensation BMC and an overlapped block motion compensation OBMC with respect to a current block in units of pixels according to a set criterion; an adaptive motion compensator for performing a motion compensation after the selection; a scan mode setter for scanning the current block in a plurality of set scan modes and establishing a scan mode causing a smallest number of transitions between the BMC and the OBMC; and an information recorder for recording transition information at locations of the pixels corresponding to the transitions between the BMC and the OBMC.

Another aspect of the present disclosure provides a hybrid block motion compensation/adaptive overlapped block motion compensation method including: performing a BMC/OBMC selection between a block motion compensation BMC and an overlapped block motion compensation OBMC with respect to a current block in units of pixels according to a set criterion; scanning the current block in a plurality of set scan modes and establishing a scan mode causing a smallest number of transitions between the BMC and the OBMC; recording transition information at locations of the pixels corresponding to the transitions between the BMC and the OBMC; and performing a motion compensation according to the BMC/OBMC selection.

Yet another aspect of the present disclosure provides a video encoding apparatus including: a motion estimator/compensator for performing a selection between a block motion compensation BMC and an overlapped block motion compensation OBMC with respect to a current block in units of pixels, performing a motion compensation after the selection to predict a predicted pixel value of each of the pixels, scanning the current block in a plurality of set scan modes and generating an established scan mode causing a smallest number of transitions between the BMC and the OBMC, and recording transition information during the scanning in the established scan mode at locations of the pixels corresponding to the transitions between the BMC and the OBMC; a subtractor for generating a residual signal by calculating a difference of the predicted pixel value of each of the pixels of the current block to an original pixel value of each of the pixels of the current block; a transformer for performing a transform on the residual signal into frequency coefficients; a quantizer for performing a quantization the frequency coefficients after the transform; and an encoder for encoding the frequency coefficients after the quantization into a bitstream.

Yet another aspect of the present disclosure provides a video decoding apparatus including: an information interpreter for performing an interpretation of information about a scan mode of a current block and information with respect to each of pixels of the current block under either a block motion compensation or an overlapped block motion compensation about transitions between the block motion compensation and the overlapped block motion compensation; and an adaptive motion compensator for operating based on the information about the scan mode and the information about the transitions after the interpretation to perform an adaptive motion compensation in units of the pixels.

Yet another aspect of the present disclosure provides a video decoding method including: performing an interpretation of information on a scan mode of a current block; performing an interpreting of information on transitions between a block motion compensation and an overlapped block motion compensation with respect to each of pixels of the current block; and performing an adaptive motion compensation in units of the pixels based on the information on a scan mode after the interpretation and the information on transitions after the interpretation.

According to the present disclosure, an encoder may include: a BMC/OBMC selector for providing optimum motion compensation selection for each of the pixels by using a dedicated criteria or formula; an adaptive motion compensator for performing a motion compensation based on the motion compensation selection; a scan mode setter for setting a mode for scanning the current block pixels provided with their motion compensation selections in a way to minimize transitions from BMC to OBMC and vice versa; and an information recorder that operates during the scanning in the set scan mode to record separate transition information for a decoder to use at the pixel location where the BMC/OBMC transition occurs. In addition, a decoder may include an information interpreter for interpreting, upon receipt of, information of the set scan mode from the encoder and information of the recorded BMC/OBMC transition from the encoder to provide the respective current block pixels with their motion compensation selections; and an adaptive motion compensator for performing optimum motion compensation for each of the pixels based on the interpreted information.

The BMC/OBMC selector starts with performing both the overlapped block motion compensation and the block motion compensation with respect to all of the pixels in the respective blocks and determines one of the two as a motion compensation method of the block which causes less absolute value of the residual pixels from between the original image and a motion compensated image. Though this technique may provide an improved motion reconstruction performance by way of time-processing always in a method with less errors in motion compensation, because the decoder is unable to reproduce the selection criteria which the encoder used, there is a need for a transmission in the form of additional information (that is, information on scan modes and BMC/OBMC transitions) as to how the respective blocks should be motion-reproduced. For this reason, processing the additional information on the basis of spatial correlations of the images enables deterministic information for the motion compensation method with very little bit rate. Specifically, assigning bits exclusively to the pixels where the BMC/OBMC transitions occur and taking advantage of various scan modes to reduce the BMC/OBMC transition regions result in a reduction of information to transmit.

The adaptive motion compensator performs the motion compensation selected in the BMC/OBMC selector. It performs BMC on the pixels under the BMC selection and OBMC on the pixels under the OBMC selection.

The scan mode setter according to the disclosure applies various modes of scan method with respect to the current block having the BMC/OBMC selections performed pixel by pixel on the basis of their spatial correlations to decide a scan mode causing a lowest frequency of the BMC/OBMC transitions. Generally, in a natural image, spatially closer pixels are more probable to have a same motion. Pixels moving in accord are supposed to undergo a same block motion compensation selected and cause infrequent BMC/OBMC transitions as will be revealed from scanning the entire pixels in a block. Moreover, when various scan modes are applied reflecting the characteristics of the block, it is possible to find the scan mode which generates the least BMC/OBCM transitions.

The information recorder of the disclosure records 1-bit information at the pixel where the BMC/OBMC transition occurs when the scanning is conducted in the set scan mode. Information about what scan mode is used and information recorded at the pixel experiencing the BMC/OBMC transition are transmitted to the decoder. Simply recording the scan mode information and the BMC/OBMC transition pixel information means very small bit rate is needed to record information for determining the motion compensation method. When this information is received and used in the decoder, a complex formula used for the BMC/OBMC determination in the encoder may be avoided advantageously in determining the BMC/OBMC in the decoding operation.

In addition, the information recorder of the disclosure has to incorporate 1-bit information for telling if the starting pixel of the current block is BMC or OBMC into the BMC/OBMC transition information. Knowing if the BMC or OBMC were applied to the first pixel is necessary to determine the motion compensation methods for the remaining pixels based on the BMC/OBMC transition information.

Based on the transmission of the information on the scan mode and the transition information recorded at the BMC/OBMC transition pixels, the information interpreter of the disclosure interprets whether BMC or OBMC was assigned with respect to the entire pixels in the current block. Therefore, the decoder of the disclosure can avoid the complex formula used to make the BMC/OBMC determinations in the encoder in determining the same to achieve optimal motion compensation.

According to the disclosure, the adaptive motion compensator of the decoder operates based on the interpreted information to perform the adaptive motion compensation by pixel units with respect to the entire pixels in the current block. Because the motion compensation used in the decoder is identical to that in the encoder, errorless optimal motion compensation may be used.

According to the present disclosure, the encoder may include steps of operation of: selecting BMC/OBMC during an encoding from performing both the BMC and the OBMC with respect to all of the pixels in the respective blocks and determining one of the two as a motion compensation method of the block which causes less absolute value of the residual pixels; determining a scan mode by first applying various scan modes with respect to the entire pixels of the current block and determining the scan mode in a way to cause the lowest frequency of the BMC/OBMC transitions; recording information based on the determined scan mode by recording information on the BMC/OBMC transitions occurring at the pixels of the current block; and performing an adaptive motion compensation in units of the pixels on the basis of the selection result from the step of selecting the BMC/OBMC. The information from the step of recording information on the BMC/OBMC transitions may be transmitted to the decoder for use in determining the BMC/OBMC.

According to the present disclosure, the decoder may include steps of operation of: performing an interpretation of information by interpreting transmitted information from the encoder and determining the BMC/OBMC with respect to the entire pixels of the current block; and adaptively performing optimal motion compensation based on the interpreted information with respect to the entire pixels of the current block.

Advantageous Effects

According to the disclosure, the encoder first determines the optimal motion compensation by pixel units and then generates very little bit of the same and transmits it to the decoder which uses this information received but no extra calculation steps to adaptively select the best motion compensation by pixel units that the encoder has determined, thereby significantly reducing the residual signal energy to be encoded to much improve the compression performance of the video compression apparatus and eventually obtain an enhanced video quality for the same bits or amount of information.

MODE FOR INVENTION

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear. Also, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

Since a video on a screen is composed of as much as thirty frames per second causing a short inter-frame interval, human eyes cannot distinguish between the frames. For this reason, casting the thirty frames within a second will make the observing eyes believe the frames are a continuous movement.

If there is such a similarity between a previous frame and a current frame, it is possible to make a prediction of a pixel value of one frame from a known value of a pixel constituting a preceding frame. This kind of prediction is called an inter prediction and is carried out frame to frame.

Such video data encoding and decoding are performed based on the technology of motion prediction. Motion prediction is carried out in a way of referencing to a past frame on a temporal axis or to both of the past frame and a future frame. The reference frame is a frame that is used as a reference for encoding or decoding a current frame. Additionally, in the block-based video coding, a still image (frame) forming the video is divided by macroblocks and subblocks which constitute the macroblock so that the image is motion-predicted and encoded in units of a block.

Prediction of a next pixel is also possible within a same frame by taking advantage of the correlations among pixel signals, and is called an intra prediction inside a frame.

Figure 1:
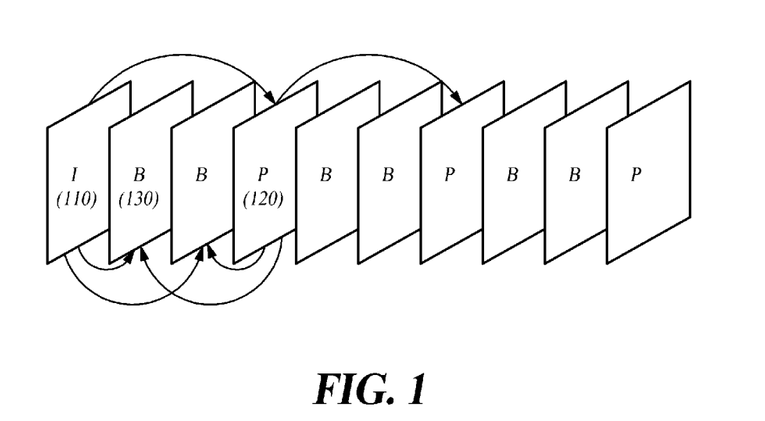
FIG. 1 is a diagram showing video frames comprising a video and being used for an inter prediction between different frames.

FIG. 1 is a diagram showing video frames comprising a video and being used for an inter prediction between different frames.

Referring to FIG. 1, video data is consisted of a series of still images. These still images are classified by a group of pictures (GOP). One GOP has an I frame 110, P frames 120, and B frames 130. I frame 110 is adapted to be encoded by itself without using a reference frame, and P frames 120 and B frames 130 are encoded through performing a motion estimation and a compensation using a reference frame. Especially, B frames 130 are encoded by forwardly and backwardly (bidirectional) predicting a past frame and a future frame, respectively.

Figure 2:
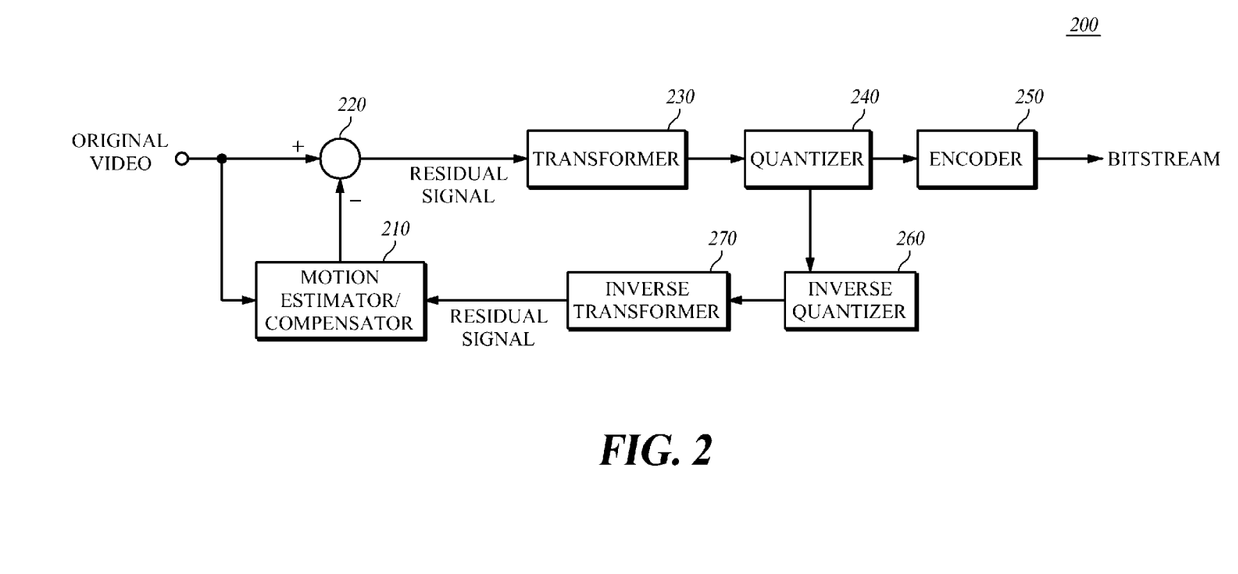
FIG. 2 is a block diagram of a video encoding apparatus according to an aspect.

FIG. 2 is a block diagram for showing a video encoding apparatus 200 according to an aspect.

Referring to FIG. 2, video encoding apparatus (or called encoder) 200 includes a motion estimator/compensator 210, a subtractor 220, a transformer 230, a quantizer 240, and an encoder 250.

Video encoding apparatus 200 may be a personal computer or PC, notebook or laptop computer, personal digital assistant or PDA, portable multimedia player or PMP, PlayStation Portable or PSP, or mobile communication terminal, smart phone or such devices, and represents a variety of apparatuses equipped with, for example, a communication device such as a modem for carrying out communications between various devices or wired/wireless communication networks, a memory for storing various programs for encoding videos and related data, and a microprocessor for executing the programs to effect operations and controls.

As described above, motion estimator/compensator 210 may predict the current block (or macroblock) by using either one or combined both of the motion prediction-based inter prediction and intra prediction for predicting a latter pixel by taking advantage of the correlations among the pixel signals within a single frame.

For example, motion estimator/compensator 210 may be formed by two divided sections of a motion estimator (not shown) and a motion compensator (not shown). The motion estimator searches the predicted value of a motion of the current frame macroblock from the reference frame and outputs their motion difference as a motion vector. In other words, the desired macroblock to find is searched for within a predetermined search area of the reference frame to identify the closest macroblock and its degree of motion is outputted as the motion vector. From the reference frame, the motion compensator gets a predicted macroblock corresponding to the obtained motion vector.

Alternatively, motion estimator/compensator 210 may be an intra predictor which predicts the current macroblock of the current frame by using macroblocks neighboring the current block, and it predicts the predicted macroblock by calculating predicted pixel values of the respective pixels in the current block using one or more pixel values of one or more adjacent macroblocks. Here, the adjacent macroblocks may be one or more macroblocks which were compressed previously of the current macroblock and are neighboring the current macroblock.

Subtractor 220 subtracts the predicted macroblock from the macroblock of the original video to calculate their difference for generating residual signals.

Transformer 230 transforms the residual signals generated by subtractor 220 into a frequency domain to obtain frequency coefficients. Here, transformer 230 performs the transform into frequency domain by using various techniques including discrete cosine transform (DCT) or wavelet transform that transforms video signals on the time axis to those of the frequency axis. In the case of I frame described with reference to FIG. 1, transformer 230 transforms the macroblocks of the original video into the frequency domain.

Quantizer 240 performs quantization on the frequency coefficients that went through transformation at transformer 230.

A residual signal refers to the macroblock of the original video subtracted by the predicted macroblock, and for the purpose of reducing the data quantity in the encoding operation the value of the residual block is encoded. Because errors are generated during the quantization, the bitstream of video data carries errors occurred through the transform and quantization.

Video encoding apparatus 200 may also incorporate an inverse quantizer 360 and an inverse transformer 370 to obtain the reference frame.

For the purpose of obtaining the reference frame, the quantized residual signal is added to the predicted video from motion estimator/compensator 210 after going through inverse quantizer 360 and inverse transformer 270 and the sum is stored in a reference frame storage unit (not shown). In the case of the I frame, it proceeds through inverse quantizer 360 and inverse transformer 370 and is stored in the reference frame storage unit. In other words, assuming the original video is A and the predicted video is B, transformer 230 receives an input of the difference A-B between the original video and predicted video to perform the transform.

Encoder 250 encodes the quantized frequency coefficients from quantizer 240 into a bitstream. For the encoding, an entropy method may be used although various other unlimited coding techniques are available for use.

Figure 3:
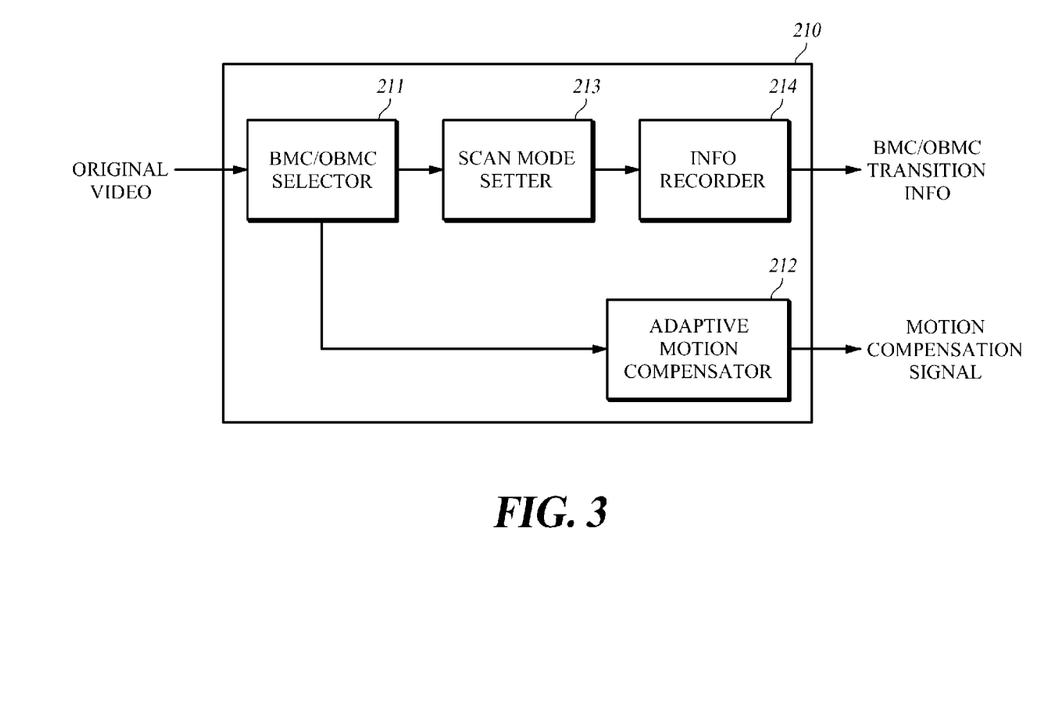
FIG. 3 is a block diagram of a hybrid block motion compensation/adaptive overlapped block motion compensation apparatus according to an aspect.

FIG. 3 is a block diagram of a hybrid block motion compensation/overlapped block motion compensation apparatus according to an aspect which corresponds to motion estimator/compensator 210 in FIG. 2 and is referenced by the same number 210.

As illustrated, this aspect of hybrid block motion compensation/overlapped block motion compensation apparatus 210 includes a BMC/OBMC selector 211, an adaptive motion compensator 212, a scan mode setter 213, and an information recorder 214.

BMC/OBMC selector 211 selects performance of BMC or OBMC by pixel unit using dedicated preset criteria with respect to the current block.

Adaptive motion compensator 212 performs the optimal compensation following the method selected by BMC/OBMC selector 211.

Scan mode setter 213 performs various scans over the entire pixels in the block having their optimal motion compensation methods selected by BMC/OBMC selector 211 and then sets the scan mode in which BMC/OBMC transitions occur the most scarcely.

Information recorder 214 operates when scan mode setter 213 performs the scanning in the set scan mode to record separate transition information at the pixel location where the BMC/OBMC transition occurs. In addition, information recorder 214 may record and incorporate BMC/OBMC selection information for a starting pixel of the set scan in the current block, that is, information for telling if the starting pixel is BMC or OBMC into the transition information.

Figure 4:
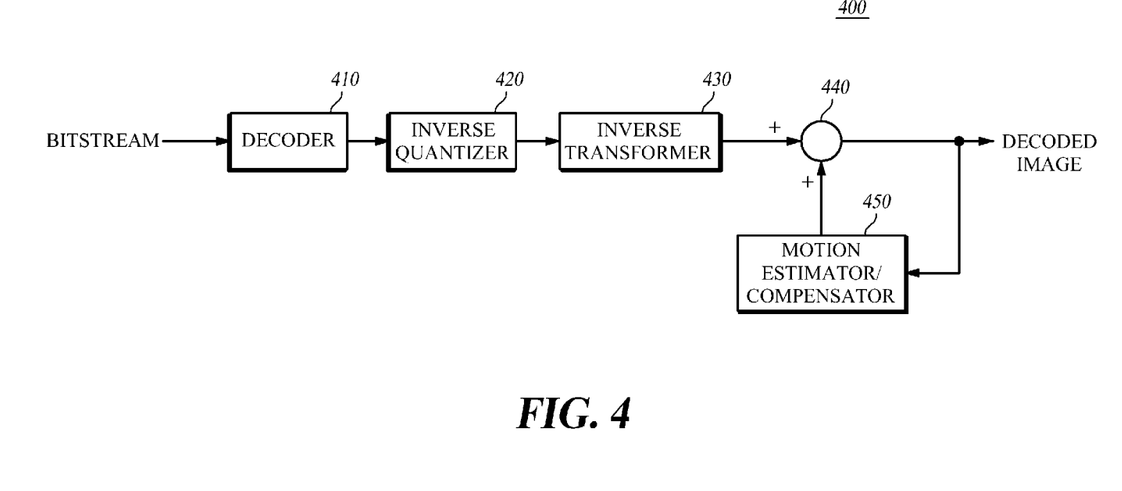
FIG. 4 is a block diagram of a video decoding apparatus according to an aspect.

FIG. 4 is a block diagram of a video decoding apparatus according to an aspect.

As illustrated, video decoding apparatus 400 in this aspect is for decoding the video by predicting the current block of the video using one or more adjacent blocks of the current block, and includes a decoder 410, an inverse quantizer 420, an inverse transformer 430, an adder 440, and a motion estimator/compensator 450.

As with video encoding apparatus 200 described with reference to FIG. 2, video decoding apparatus 400 may be a personal computer or PC, notebook or laptop computer, personal digital assistant or PDA, portable multimedia player or PMP, PlayStation Portable or PSP, or mobile communication terminal, smart phone or such devices, and may represent a variety of apparatuses equipped with, for example, a communication device such as a modem for carrying out communications between various devices or wired/wireless communication networks, a memory for storing various programs for encoding videos and related data, and a microprocessor for executing the programs to effect operations and controls.

Decoder 410 decodes the bitstream to extract the quantized frequency coefficients. Specifically, decoder 410 decodes the bitstream which is the video encoded by video encoding apparatus 200 and extracts the quantized frequency coefficients which contain pixel information of the video current block.

Inverse quantizer 420 performs a de-quantization with respect to the frequency coefficients extracted from the bitstream by decoder 410.

Inverse transformer 430 inversely transforms the de-quantized frequency coefficients from inverse quantizer 420 into time-domain to generate a residual signal.

Adder 430 adds predicted pixel values of the respective pixels of the current block predicted by motion estimator/compensator 450 to the inversely transformed residual signal to reconstruct the original pixel value of the current block.

Figure 5:
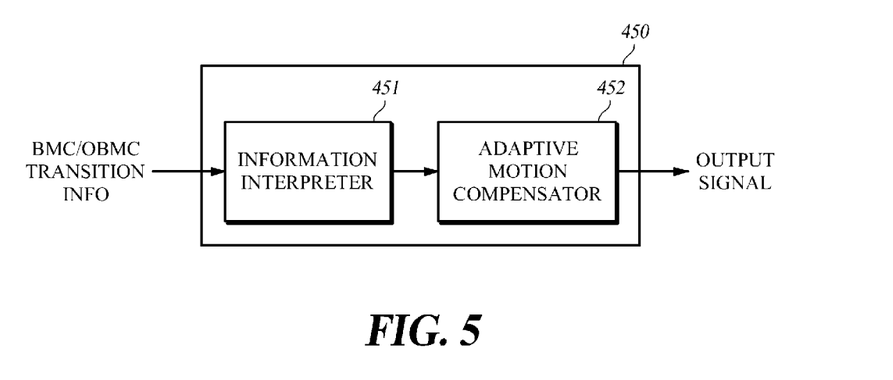
FIG. 5 is a block diagram of a hybrid block motion compensation/adaptive overlapped block motion compensation apparatus according to another aspect.

FIG. 5 is a block diagram of a hybrid block motion compensation/overlapped block motion compensation apparatus according to an aspect which corresponds to motion estimator/compensator 450 in FIG. 4 and is referenced by the same number 450.

As illustrated, this aspect of a hybrid block motion compensation/overlapped block motion compensation apparatus 450 includes an information interpreter 451 and an adaptive motion compensator 452.

Based on transmission of the transition information as to the pixel locations where the BMC/OBMC transitions occurred and the scan mode information as to what scan mode was used, information interpreter 451 interprets whether the motion compensations of the respective pixels in the current block were done in BMC or OBMC.

Adaptive motion compensator 452 operates based on information interpreted by information interpreter 451 (the scan mode information and BMC/OBMC transition information) to perform the adaptive motion compensation by pixel units.

Figure 6:
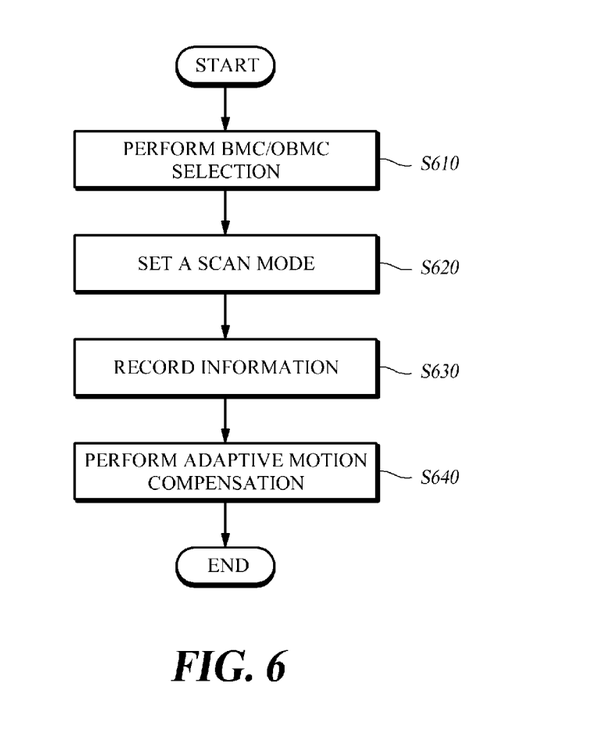
FIG. 6 is a flow diagram for illustrating a hybrid block motion compensation/adaptive overlapped block motion compensation method according to an aspect.

FIG. 6 is a flow diagram for illustrating a hybrid block motion compensation/overlapped block motion compensation method according to an aspect, and will be described as operatively applied to motion estimator/compensator 210 of encoder 200 in FIG. 2 corresponding to hybrid block motion compensation/overlapped block motion compensation apparatus 210 in FIG. 3.

First, BMC/OBMC selector 211 selects performance of BMC or OBMC by pixel unit using dedicated criteria with respect to the current block in step S610.

Next in step S620, scan mode setter 213 performs various scans over the entire pixels in the block having their motion compensation methods selected by BMC/OBMC selector 211 and then sets the scan mode in which BMC/OBMC transitions occur the most scarcely.

Then, information recorder 214 operates at the scanning in the set scan mode to record separate transition information at the pixel location where the BMC/OBMC occurs in step S630.

In the last step S640, adaptive motion compensator 212 performs the optimal compensation following the method selected by BMC/OBMC selector 211.

Figure 7:
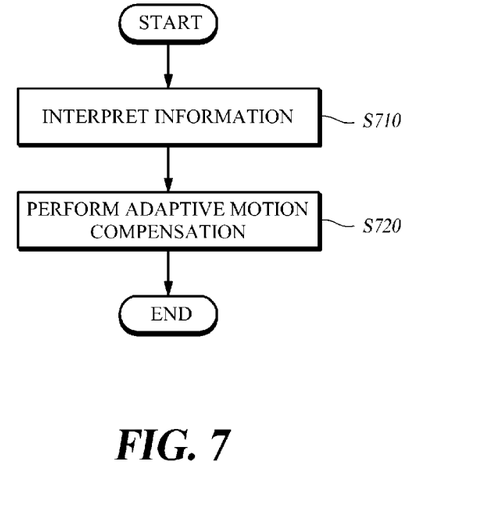
FIG. 7 is a flow diagram for illustrating a hybrid block motion compensation/adaptive overlapped block motion compensation method according to another aspect.

FIG. 7 is a flow diagram for illustrating a hybrid block motion compensation/overlapped block motion compensation method according to another aspect, and will be described as applied to motion estimator/compensator 450 of decoder 400 in FIG. 4 corresponding to hybrid block motion compensation/overlapped block motion compensation apparatus 450 in FIG. 5.

Firstly in step S710, based on a transmission of the transition information on the pixel locations where the BMC/OBMC transitions occurred and the scan mode information on the scan mode used, information interpreter 451 interprets whether the motion compensations of the respective pixels in the current block were done in BMC or OBMC.

Lastly in step S720, adaptive motion compensator 452 operates based on the interpreted information to perform the adaptive motion compensation by pixel units.

Now, a particular example of the present disclosure will be presented to facilitate a more specific understanding of the above description.

For the purpose of the specific description, the overlapped block motion compensation technique of H.263 ("Video coding for low bit rate communication", Draft, ITU-T Recommendation H.263, September 1997) will be first discussed.

The overlapped block motion compensation by H.263 is accomplished in units of 8×8 block through a calculation of Equation 1:

$$p(x, y) = \left[ q(x, y) \cdot H_C(x, y) + \sum_N r_N(x, y) \cdot H_N(x, y) + 4 \right] \Big/ 8 \quad \text{[Equation 1]}$$

Here, p(x,y) means a motion compensated pixel value to be generated by the overlapped block motion compensation, and coordinates (x,y) indicate the locations of pixels in the 8×8 block and have values 0 to 7 with the top left location of the block being (0,0). In addition, q(x,y) means a motion compensated pixel value of the 8×8 block subject to the current reconstruction and it is obtained through Equation 2 if the motion vector received via transmission for the current block ($MV_C^x$, $MV_C^y$):

$$q(x,y) = f_{t-1}(x + MV_C^x, y + MV_C^y) \quad \text{[Equation 2]}$$

Here, $f_{t-1}(x,y)$ means the pixel values of the previously reconstructed image at locations (x,y).

In Equation 1, N indicates neighboring blocks of the block subject to a current reconstruction and is valued T, B, L, or R representing indices of blocks neighboring the current block at its top, bottom, left, and right boundaries, respectively. Therefore, when N=T is given, $r_N(x,y)$ is obtained as with $r_T(x,y) = f_{t-1}(x + MV_T^x, y + MV_T^y)$, where ($MV_T^x$, $MV_T^y$)| means a motion vector received via transmission for the top adjacent block to the current block. Similarly, for other values of N, it is also possible to obtain $r_N(x,y)$ by using motion vectors of the neighboring blocks and the previously reconstructed image. Finally, in Equation 1, $H_C(x,y)$ and $H_N(x,y)$ represent weights located at (x,y) and multiplied by q(x,y), a block of pixels reconstructed into the motion vector of the current block and by $r_N(x,y)$, a block of pixels reconstructed into the motion vector of the neighboring block, the weight matrix by the respective locations being illustrated in FIG. 8.

Figure 8:
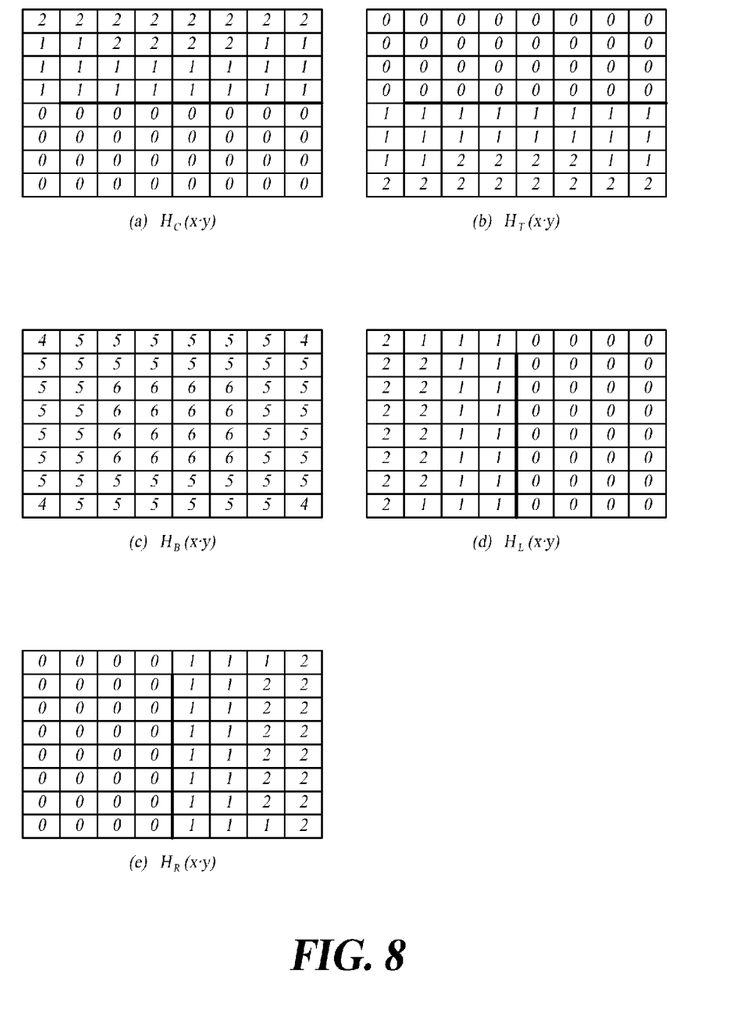
FIG. 8 is a diagram for showing a weight matrix of H.263 overlapped block motion reconstruction according to an aspect.

As described above, the overlapped block motion compensation method by H.263 uses the statistically optimized fixed weight matrix to perform motion compensations for every 8×8 block via Equation 1 and thereby noticeably reduces the block effect relatively to its prior art block motion compensations. However, the reconstructed image will have partial blocks that generate significantly degraded residual signals compared to the prior art block motion compensations, and the conventional techniques as above merely amount to setting the respectively proprietary criteria for identifying such partial blocks. Further, even with the blocks through the overlapped block motion compensation which may seem to be excellent over those through the block motion compensation, it is visible that not all of the neighboring boundary blocks positively affect the results of the overlapped block motion compensation, which suggests the necessity of an adaptive application of the overlapped block motion compensation by units of block boundary not of block or by more refined units of pixel for the purpose of the performance enhancement. However, the application of the overlapped block motion compensation in the pixel level needs the determination of whether to have all of the pixels constituting the image go through the overlapped block motion compensation, which entails complex computations. Particularly, the implementations of the decoder by PC, notebook or laptop computer, PDA, PMP, PlayStation Portable or PSP, or mobile communication terminal have a limited operation capacity and get into troubles with their implementations in the case of a high computational complexity on the decoder and thus reducing the decoder computing complexity is critical.

In order to solve this problem, the present disclosure provides a method and an apparatus for performing optimal overlapped block motion compensation by pixel units without an extra complex computation.

In FIG. 3, to determine optimal overlapped block motion compensation methods for all of the pixels of the current block, BMC/OBMC selector 211 compares the absolute values of residual pixels from the BMC way conducted on every one of the pixels in the current blocks against those from the OBMC way on the same pixels and identifies the blocks after the motion compensation in such ways that generated the lower absolute values of the residual pixels.

When the pixel values in a block of an image under encoding are defined $f_t(x,y)$, the pixels after a block-motion-reconstruction by using motion vectors of the current block are defined $f_C(x,y)$, and the motion compensated pixels to be generated by an overlapped block motion compensation in consideration of adjacent blocks are p(x,y), the residual signals $R_{BMC}(x,y)$ with the block motion compensation applied and the residual signals $R_{OBMC}(x,y)$ with the overlapped block motion compensation applied may be expressed as Equation 3 and Equation 4, respectively.

The calculated $R_{BMC}(x,y)$ from Equation 3 and $R_{OBMC}(x,y)$ from Equation 4 are used to check for satisfaction of Equation 5 and if yes, the pixels at location (x, y) are made to generate through BMC, and otherwise, through OBMC. In this way, since the motion compensation is performed generating less residual pixels, which enhances the encoding performance.

Being an aspect of the present disclosure, the criterion applied in the above description may be replaced by any other BMC/OBMC determining criteria with the scope of the instant disclosure.

$$R_{BMC}(x,y) = f_t(x,y) - f_C(x,y) \quad \text{[Equation 3]}$$

$$R_{OBMC}(x,y) = f_t(x,y) - p(x,y) \quad \text{[Equation 4]}$$

$$|R_{BMC}(x,y)| \leq |R_{OBMC}(x,y)| \quad \text{[Equation 5]}$$

In FIG. 3, scan mode setter 213 operates on the entire pixels in the current block and scans them in diverse directions to determine scan modes in ways to cause transitions from OBMC to BMC and vice versa.

Adjacent pixels in the block may have a high probability of shaping a same object in an image so that they have a common motion. This leads to a high probability that the pixels adjacent to the current block use a same motion compensation method. In addition, since a block may contain different objects having a common motion at various locations, orienting the scan to have the pixels of the same object expressed in series will cause very little BMC/OBMC transitions enabling expression of the motion compensation by each pixel requiring very small bite rate.

Figure 9:
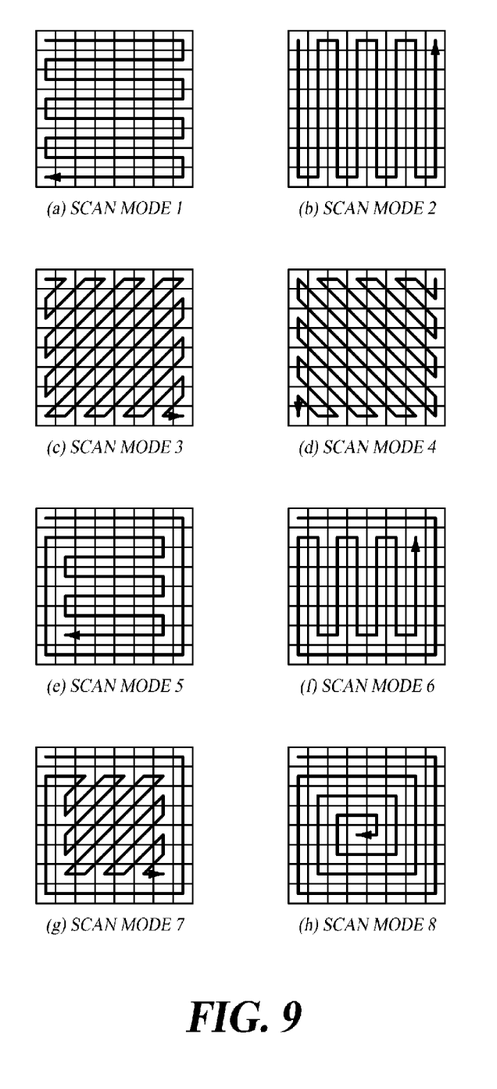
FIG. 9 is a diagram for showing various scan modes according to an aspect.

FIG. 9 is various exemplary scan modes applicable by the present disclosure, wherein the diverse scan directions match with the locations of objects within a block so that BMC/OBMC transitional spots are minimized.

Eight scan modes in FIG. 9 are merely an example of the disclosure and other different scan modes may be used with the scope of the present disclosure.

Although increasing the modes of scan may bring a better chance to have the scan method of getting less BMC/OBMC transitions and save bits correspondingly, bits for assigning the scan modes will increase. If there are 'n' preset scan modes, the assigning bits are required by the number of $\log_2 n$. Within the scope of the present disclosure is a method for determining BMC/OBMC for the entire pixels in a block with the minimum possible bit assignments by establishing the best compromise relationship.

In FIG. 3, information recorder 214 operates when reading pixels values in the above scan modes to assign 1-bit information on the location where the BMC/OBMC transitions occur.

During the decoding operation of decoder 400 in FIG. 4, information interpreter 451 in FIG. 5 interprets scan mode information on the performed mode of scanning and the 1-bit information assigned to the pixel where BMC/OBMC transition occurs, and then adaptive motion compensator 452 may determine between BMC and OBMC to perform and accomplish the optimal motion compensation.

In the description above, although the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the embodiments of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those skilled in the art will appreciate that various modifications, additions and substitutions are possible, without departing from essential characteristics of the disclosure. Therefore, exemplary embodiments of the present disclosure have not been described for limiting purposes. Accordingly, the scope of the disclosure is not to be limited by the above embodiments but by the claims and the equivalents thereof.

INDUSTRIAL APPLICABILITY

As described above, the present disclosure is highly useful for application to video encoding/decoding techniques to allow the optimized motion compensation method by pixel units to be adaptively selected without needing a complex computation to greatly reduce the residual signal energy of the block to be encoded to enhance the compression performance of the video compression apparatus significantly, and eventually generates improved video quality for the bits (or information quantity) used.

The invention claimed is:

1. A hybrid block motion compensation/adaptive overlapped block motion compensation (BMC/OBMC) apparatus comprising:

a BMC/OBMC selector configured to perform a pixel-by-pixel selection of one of a block motion compensation (BMC) and an overlapped block motion compensation (OBMC) with respect to each pixel of a current block according to a preset criterion;

an adaptive motion compensator configured to perform a motion compensation according to the selected one of the BMC and the OBMC;

a scan mode setter configured to scan the current block in a plurality of scan modes and establish a scan mode causing a smallest number of transitions between the BMC and the OBMC with respective to each pixel of the current block in the course of the scanning with respect to the established scan mode; and an information recorder configured to record transition information at locations of pixels corresponding to the transitions between the BMC and the OBMC with respective to the established scan mode.

2. The apparatus of claim 1, wherein the BMC/OBMC selector is configured to compare, with respect to each pixel of the current block, an absolute value of one residual pixel through performing the BMC with another absolute value of another residual pixel through performing the OBMC to thereby elect a motion compensation method with a smaller absolute value of a residual pixel between the absolute value of the one residual pixel through the BMC and the another absolute value of another residual pixel through the OBMC.

3. The apparatus of claim 1, wherein the information recorder is configured to record information on the selected one of the BMC and the OBMC with respect to a starting pixel of the scanning over the current block.

4. A hybrid block motion compensation/adaptive overlapped block motion compensation (BMC/OBMC) method performed by a hybrid BMC/OBMC apparatus, the method comprising:

performing a pixel-by-pixel selection of one of a block motion compensation (BMC) and an overlapped block motion compensation (OBMC) with respect to each pixel of a current block according to a preset criterion;

scanning the current block in a plurality of set scan modes and establishing a scan mode causing a smallest number of transitions between the BMC and the OBMC in the course of the scanning with respective to each pixel of the current block;

recording transition information at locations of the pixels corresponding to the transitions between the BMC and the OBMC with respective to the established scan mode; and performing a motion compensation according to the selected one of the BMC and the OBMC.

5. The method of claim 4, wherein the preset criterion of the selecting one is to make comparison with respect to each pixel of the current block between an absolute value of one residual pixel through performing the BMC and another absolute value of another residual pixel through performing the OBMC to thereby elect a motion compensation method with a smaller absolute value of a residual pixel between the absolute value of the one residual pixel through the BMC and the another absolute value of another residual pixel through the OBMC.

6. The method of claim 4, wherein the recording the transition information records information on the selected one of the BMC and the OBMC with respect to a starting pixel of the scanning over the current block.

7. A video encoding apparatus comprising:
a motion estimator/compensator configured to
perform a pixel-by-pixel selection of one of a block motion compensation (BMC) and an overlapped block motion compensation (OBMC) with respect to each pixel of a current block,
perform a motion compensation according to the selected one of the BMC and the OBMC to predict a predicted pixel value with respective to each pixel of the current block,
scan the current block in a plurality of scan modes and generate an established scan mode causing a smallest number of transitions between the BMC and the OBMC in the course of the scanning with respective to each pixel of the current block, and
record information on the transitions in the course of the scanning in the established scan mode at locations of pixels corresponding to the transitions between the BMC and the OBMC with respective to the established scan mode;
a subtractor configured to generate a residual signal by calculating a difference of the predicted pixel value of each pixel of the current block to an original pixel value of each pixel of the current block;
a transformer configured to perform a transform on the residual signal into frequency coefficients;
a quantizer configured to perform a quantization the frequency coefficients after the transform; and
an encoder configured to encode the frequency coefficients after the quantization into a bitstream.

8. The video encoding apparatus of claim 7, wherein the motion estimator/compensator is configured to make comparison with respect to each pixel of the current block between an absolute value of one residual pixel through performing the BMC and another absolute value of another residual pixel through performing the OBMC to thereby elect a motion compensation method with a smaller absolute value of a residual pixel between the absolute value of the one residual pixel through the BMC and the another absolute value of another residual pixel through the OBMC.

9. The video encoding apparatus of claim 7, wherein the motion estimator/compensator is configured to record information on the selected one of the BMC and the OBMC with respective to a starting pixel of the scanning over the current block.

10. A video decoding apparatus comprising:
an information interpreter configured to interpreting information on a scan mode of a current block and information on transitions between a block motion compensation (BMC) or an overlapped block motion compensation (OBMC) in the course of pixel-by-pixel scanning with respective to each pixel of the current block based on the interpreted information on the scan mode; and
an adaptive motion compensator configured to perform pixel-by-pixel adaptive motion compensation with respective to each pixel of the current block based on the interpreted information about the transitions.

11. The video decoding apparatus of claim 10, wherein the interpreted information about the scan mode is provided by a video encoding apparatus for
performing an adaptive motion compensation through selecting one from the BMC and the OBMC with respect to each pixel of the current block, and
scanning the current block in a plurality of scan modes and establishing a scan mode causing a smallest number of transitions between the BMC and the OBMC.

12. The video decoding apparatus of claim 11, wherein the information about the transitions is recorded during the scanning in the scan mode at locations of pixels corresponding to the transitions between the BMC and the OBMC.

13. The video decoding apparatus of claim 11, wherein the interpreted information about the transitions includes information on the selected one of the BMC and the OBMC with respect to a starting pixel of the scanning over the current block.

14. A video decoding method performed by a video decoding apparatus, comprising:
interpreting information on a scan mode of a current block;
interpreting information on transitions between a block motion compensation (BMC) and an overlapped block motion compensation (OBMC) in the course of pixel-by-pixel scanning with respect to each pixel of the current block based on the interpreted scan mode; and
performing a pixel-by-pixel adaptive motion compensation with respective to each pixel of the current block based on the interpreted information on the transitions between the BMC and the OBMC in the course of the scanning.

15. The video decoding method of claim 14, wherein the interpreted information about the scan mode is provided by a video encoding apparatus for
performing an adaptive motion compensation through selecting one from the BMC and the OBMC with respect to each pixel of the current block, and
scanning the current block in a plurality of scan modes and establishing a scan mode causing a smallest number of transitions between the BMC and the OBMC.

16. The video decoding method of claim 15, wherein the interpreted information about the transitions is recorded during the scanning in the scan mode at locations of pixels corresponding to the transitions between the BMC and the OBMC.

17. The video decoding method of claim 15, wherein the interpreted information about the transitions includes information on the selected one of the BMC and the OBMC with respect to a starting pixel of the scanning over the current block.

* * * * *